United States Patent [19]

Fayfield

[11] Patent Number: 4,598,198

[45] Date of Patent: Jul. 1, 1986

[54] AUTOMATIC POWER CONTROL FOR MODULATED LED PHOTOELECTRIC DEVICES

[75] Inventor: Robert W. Fayfield, Excelsior, Minn.

[73] Assignee: Banner Engineering Corp., Minneapolis, Minn.

[21] Appl. No.: 612,664

[22] Filed: May 21, 1984

[51] Int. Cl.[4] .......................... G01J 1/32; H01J 40/14; H05B 37/02

[52] U.S. Cl. .................................... 250/205; 250/206; 250/552; 307/311; 315/149; 315/307

[58] Field of Search ........... 250/205, 206, 214, 214 C, 250/214 DC, 552; 307/311; 315/149, 154, 156, 158, 307

[56] References Cited

U.S. PATENT DOCUMENTS 3,023,376 2/1962 Smith et al. .
3,323,015 5/1967 Everest .
3,414,765 12/1968 McKnight et al. .
3,906,292 9/1975 Takahashi .
4,277,755 7/1981 Fausone et al. .
4,356,393 10/1982 Fayfield .......................... 250/214 R
4,403,139 9/1983 DeLoach, Jr. ...................... 250/205

*Primary Examiner*—David C. Nelms
*Assistant Examiner*—Stephone B. Allen
*Attorney, Agent, or Firm*—Merchant, Gould, Smith, Edell, Welter & Schmidt

[57] ABSTRACT

A pulsed light emitting diode used as the light source in a photoelectric scanner is operated from a secondary power source which automatically adjusts the power to the LED approximately inversely proportional to frequency as the modulating frequency of the scanner is adjusted over a range, so that the average power of the LED remains approximately constant, within safe operating limits and close to optimum, over the range of adjustment. In the preferred embodiment this is accomplished by operating the LED from a capacitor used as a secondary power source without a series current limiting resistor for the LED. Peak current is determined by the forward characteristics of the diode and the voltage on the capacitor, and an impedance controls the recharging of the capacitor during the off time such that the desired average power characteristics are achieved as operating frequency varies.

8 Claims, 1 Drawing Figure

AUTOMATIC POWER CONTROL FOR MODULATED LED PHOTOELECTRIC DEVICES

TECHNICAL FIELD OF THE INVENTION

This invention relates generally to the field of photoelectric scanners, and particularly to scanners using a pulsed or modulated light emitting diode as the light transmitting element.

BACKGROUND OF THE PRIOR ART

Photoelectric scanners are widely used in industrial control systems for measurement or detection of objects passing through a light beam passing between emitter and receiver portions of the scanner system. Most scanner systems use light emitting diodes (LED's) as the light emitting element because they have a number of advantageous electrical and optical properties. Virtually all LED scanner systems use a modulated or pulsed mode of operation for the LED, as opposed to continuous operation. Pulsed operation permits the receiver to be AC coupled so that it will be immune to ambient or steady state light, and it also permits operating the LED at a high peak power with a low duty cycle in order to keep the average power within the limit for the particular LED. The higher peak power means that the scanner can be operated at a longer range, i.e. with a greater optical path length between emitter and receiver.

In modulated LED scanner systems the choice of modulation or pulse frequency is a compromise between conflicting requirements for response time and range. The reason for this is that most receivers are designed either to integrate or count pulses received, and to respond only to the receipt of a certain number of consecutive pulses. This operation is used to provide noise immunity to avoid false operation due to high frequency light sources such as fluorescent and vapor lamps or other photoelectric controls, or due to electrical interference. Since a specific number of pulses must be received successively in order for the control to provide a true change in output signal, it is apparent that the response time is inversely proportional to the frequency of operation, and that a high frequency would be desirable to minimize response time. However, due to requirements of the light receiving circuitry, it is generally necessary that the duration of the individual emitted light pulses be held to at least some minimum value, for example 10 microseconds. Since this duration cannot be reduced as the repetition rate is increased, the result is an increase in the duty cycle for the LED, which means that the LED would be operated at higher average power levels with increasing frequency. It is therefore necessary to select the peak power during a pulse of the LED in conjunction with the duty cycle to keep average power within safe limits for the particular LED. Thus a trade-off is possible between fast response time and shorter range, or slow response time and longer range. Because of this trade-off some manufacturers have provided several models of each type of scanner designed to different response time and power ranges to meet different needs for different applications. However, that involves additional cost in manufacturing and maintaining a larger inventory of parts, both for the manufacturer and for large users who have to stock a number of different models for different applications.

It would be possible to provide a switch or potentiometer on the scanner to adjust the frequency of operation and thereby adjust the response time. However, that would require that the power to the LED be set for the worse case (highest frequency) and therefore would provide no benefit regarding maximizing range. To maximize range it would be necessary to adjust the power to the LED as the adjustment to operating frequency were made. This oould be done by providing switches or matched potentiometers that would switch or change component values in both the frequency determining circuits and the LED power determining circuits, but these solutions are costly, both in terms of cost of manufacture and in terms of requirement for space in the device, many of which are miniaturized for flexibility of applications. In the case of switches, there is a further disadvantage of not providing continuously variable parameters for adjustment to specific needs. If matched potentiometers were used, they would have to be matched to a high degree of precision so that the LED power could be safely adjusted to optimum corresponding to each change in frequency, and the high precision would add to cost of manufacture.

SUMMARY OF THE INVENTION

These and other problems existing in the prior art are overcome by the present invention, which provides for automatic adjustment of LED power to optimize range as frequency is changed.

The present invention provides an improved modulated light source for a photoelectric control including a light emitting diode and a secondary power supply for the light emitting diode, which is a capacitor in the preferred embodiment of the invention. A source of variable frequency, variable duty cycle modulating signals is provided, and is operatively connected, through a switch or other means, to the light emitting diode to cause it to selectively conduct current in response to the modulating signal. A charging path is provided for the controlled charging of the capacitor, for example during the intervals when the light emitting diode is not conducting, such that the charge on the capacitor varies approximately inversely with changes in the duty cycle of the modulation of the light emitting diode, to thereby maintain the average power of the light emitting diode relatively constant, despite variations in the frequency and duty cycle of the emitted light.

BRIEF DESCRIPTION OF THE DRAWIMG

In the drawing, FIG. 1 is an electrical schematic diagram of a scanner system utilizing the invention.

DETAILED DESCRIPTION OF THE PREFERRED EMBODIMENT

Figure 1:
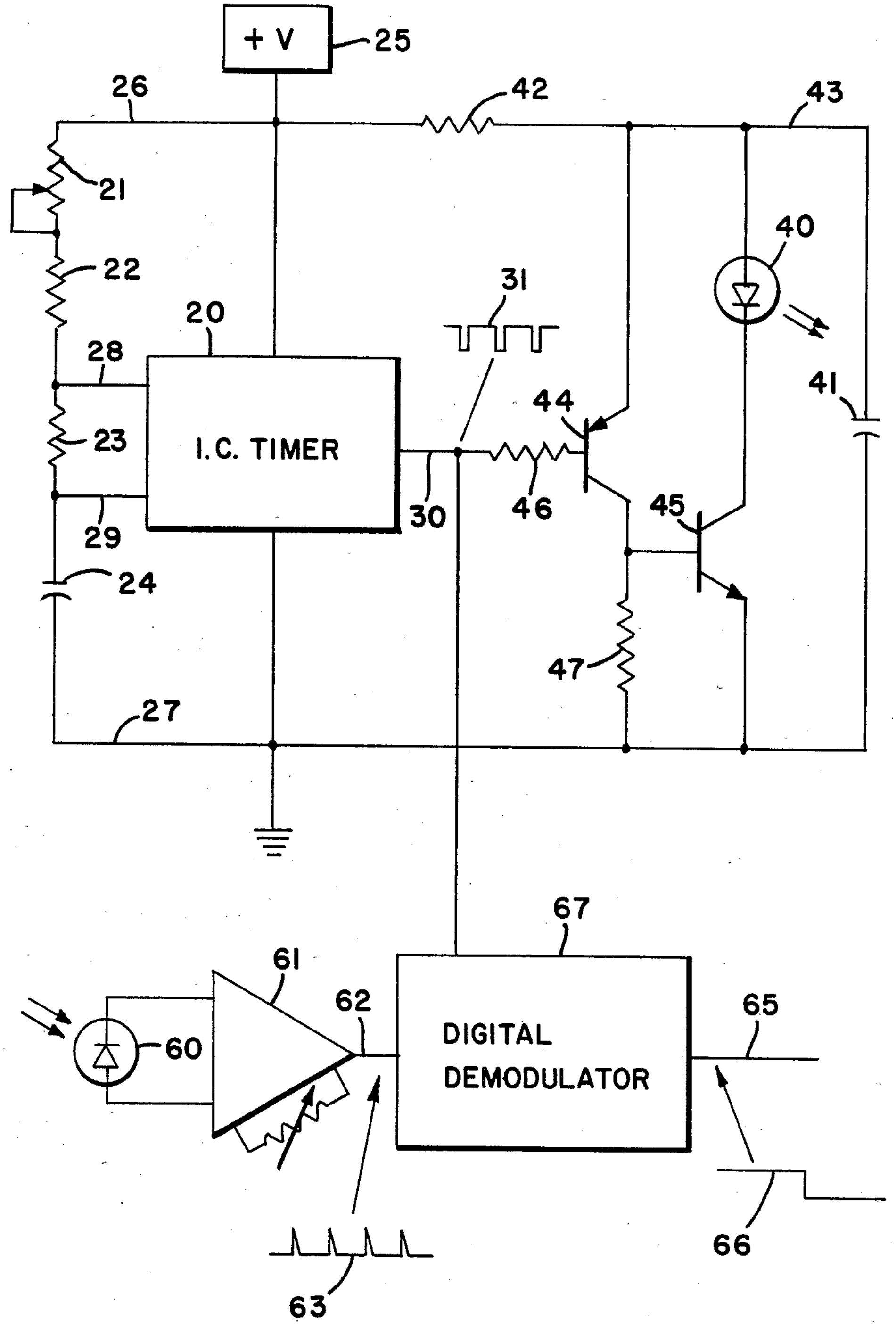

The system shown in the drawing includes a transmitter circuit 10 and a receiver circuit 11, although the present invention is concerned primarily only with the transmitter portion. Transmitter circuit 10 and receiver circuit 11 can be mounted in separate housings for operation spaced apart from one another, or they can be mounted in the same housing for operation with a retroreflector, as is generally known in the art.

For convenience of description, transmitter circuit 10 can be further broken down into an oscillator portion which consists of integrated circuit 20 and associated components, and an output section which consists of LED 40 and associated components. Any type of oscillator may be used for generating the pulses for the pulsed mode operation which are then used to drive the LED 40. In the preferred embodiment, a type 555 monolithic timing circuit, for example a Motorola MC 1555 or equivalent, is used for this purpose. Timer 20 is provided with external connections and components to operate in an astable mode, as is generally known. Specifically, variable resistor 21, resistors 22 and 23 and capacitor 24 are provided for this purpose. Variable resistor 21 and resistor 22 are connected in series between a power lead 26 and a lead 28 which connects to the "discharge" terminal of IC 20. Resistor 23 connects from lead 28 to a lead 29 which connects to the "threshold" terminal of IC 20. Capacitor 24 connects from lead 29 to ground lead 27. A suitable power supply 25 is connected to power lead 26 for providing operating potential for the circuit, for example 5 volts DC in the preferred embodiment. Power and ground connections are also provided to IC 20.

The signal output of timer 20 is connected to lead 30. A branch of this lead goes to the receiver, and a branch connects through resistor 46 to the base of transistor 44. The emitter of transistor 44 connects to a branch of a lead 43, and the collector connects to resistor 47 and also to the base of transistor 45. The other side of resistor 47 connects to signal ground, as does the emitter of transistor 45.

The light emitting element is LED 40, and its anode connects to lead 43 and its cathode connects to the collector of transistor 45, so that that transistor can control the switching of current through the LED. The operating current for LED 40 comes from a secondary power source 41, which, in the preferred embodiment, is in the form of a capacitor connected between lead 43 and signal ground. An impedance, which in the preferred embodiment is a resistor 42, connects between power supply 25 and the secondary power source, capacitor 41.

The receiver circuit 11 is indicated in block diagram as follows. A sensing element in the form of a photodiode 60 is positioned to receive the light being emitted by LED 40 and is spaced therefrom along an optical path through which the objects to be detected will pass. Signals from photodiode 60 are connected to the input of an adjustable gain amplifier 61, whose output at lead 62 connects to a digital demodulator 67. Demodulator 67 also receives clock pulses on a branch of lead 30 from the timer. The output of the device is at lead 65 which provides a useful output signal corresponding to the presence or absence of an object in the light path, as is generally known. Logic functions can be included in the receiver to provide on-delay, off-delay, light operate, dark operate, etc. and other logic functions as are generally known in the art.

The receiver circuit shown is representative only, since many different receiving schemes are possible. For example, instead of the digital demodulator, an integrator type demodulator could be provided which would integrate the received pulses over time. In that case, however, the integration time constants would have to be changed for different desired response times.

In the operation of the system, timer circuit 20 and associated components operate as an oscillator to produce an output signal at lead 30 consisting of a train of negative going pulses, as suggested by waveform 31. Capacitor 24 charges through resistors 21, 22 and 23 until it reaches the threshold voltage of the timer 20. The output at lead 30 then goes low, discharging capacitor 24 through resistor 23, which is internally switched to ground. The width of the individual pulses is determined by capacitor 24 and resistor 23, and in the preferred embodiment is held fixed at a safe minimum value required for the operation of the receiver, for example 10 microseconds. The charge time is determined by the combination of resistors 21, 22 and 23 and capacitor 24, and resistors 21 and 22 are chosen much larger than resistor 23 to give an overall frequency of operation of, for example, 400 hz to 4 khz.

When the pulse signal at 30 goes low, transistors 44 and 45 are turned on which allows current to flow from the secondary power source, capacitor 41, through LED 40 causing it to emit light. At the end of a pulse at lead 30, transistors 44 and 45 are turned off, terminating the light pulse. In the preferred embodiment capacitor 41 is chosen to be large enough so that it loses only a small percentage of its voltage during a single pulse. The power control impedance, resistor 42, allows a controlled recharging path for the secondary power source, capacitor 41, during the off time of the cycle.

The emitted pulses from LED 40 are received by receiver element 60 (assuming no obstruction) and are amplified producing a pulse train at lead 62 as suggested by waveform 63. This is compared by digital demodulator 67 to the clock frequency from the timer, and when a predetermined number of pulses are received, for example N equals 4, the output 65 changes state as suggested by waveform 66. Assuming a range of frequency adjustment for the transmitter of from 400 hz to 4 khz, as discussed above, and assuming a demodulator count of 4 pulses for change of state, the time response of the system would be 10 milliseconds at 400 hz, or 1 millisecond at 4 khz.

Before describing the power considerations for LED 40 of the present invention and the manner in which the secondary power source cooperates with it to vary the power inversely with frequency, it is illustrative for comparison purposes to first note the manner in which LED power is controlled in prior art scanners. In such systems the current is established through the LED either by connecting it through a current limiting resistor to the power supply, or connecting it to a constant current transistor source. In most cases the current to the LED is made to be independent of changes in supply voltage, oscillator frequency, or other variables which might change the current or power through the LED. In a typical application with the frequency variable from 400 hz to 4 khz in order to give a variable response time of from 10 milliseconds to 1 millisecond because of the fixed pulse duration of 10 microseconds, the duty cycle of the LED would vary from 0.4 percent to 4.0 percent. This means that the maximum current to the diode would have to be established in consideration of the high duty cycle at the high frequency setting, which means that at lower frequency settings the LED would be operating at less than the full power it is capable of.

In contrast to the above described prior art devices, the present invention provides a means for automatically adjusting the peak current delivered to the LED during a pulse approximately inversely proportional to changes in frequency, so that at a low operating frequency, corresponding to a slow response time, the peak current is increased, thereby providing an increase in range (distance) for the scanner. In this manner a useful trade-off is provided between response time and operating range, or distance. This is achieved by operating the LED from the secondary power source provided by this invention.

In the preferred embodiment, the LED operates directly from the secondary power source, capacitor 41, without any current limiting resistor, and without any transistor constant current source. Transistor 45 acts only as a switch. The current through LED 40 is determined by its own internal impedance, which can be determined from the forward voltage versus forward current specifications for the LED. For example, a General Electric F5D1 gallium aluminum arsenide infrared emitting diode has a forward current of about 1 amp for a 4 volt supply, and 250 milliamps for a 2.5 volt supply. Through appropriate selection of the power control resistor 42 and the secondary power source capacitor 41, these two values can be used for the end limits for the circuit shown in the FIGURE as the frequency is increased from 400 hz to 4 khz. At the higher frequency, charge is removed faster from the capacitor and the voltage will stabilize at about 2.5 volts; at the lower frequency, the voltage stabilizes at about 4 volts. Power control resistor 42 is chosen so that the power rating of the LED is never exceeded, and this value is about 100 ohms in the example given.

Thus, at the low frequency setting of 400 hz in this example, the peak power of the LED is 4 watts, and the average power at a duty cycle of 0.4 percent is 16 milliwatts. At the high frequency setting of 4 khz, the peak power of the LED is 625 milliwatts, and the average power at a duty cycle of 4.0 prcent is 25 milliwatts. Thus the average power of the LED is allowed to vary only a small amount—from 16 milliwatts to 25 milliwatts—as the frequency, duty cycle, response time and peak power are varied over an approximately 10 to 1 range. This adjustment of power to LED 40 is done automatically by the circuit in response to the operating frequency, which may be varied at will. The automatic power adjustment is accomplished through the action of secondary power source 41, impedance 42 and the LED without requiring any adjustable or switchable components. Only the frequency control resistor 21 is variable, and it does not need to be a precision component.

A further benefit of the invention is reduced sensitivity of the circuit to variations in the impedance of individual LED's over a large sampling. With a conventional constant current transistor source driving the LED the highest power dissipation would occur with an individual LED that has the highest impedance, since the dissipated power is the constant current squared times impedance times duty cycle. Such prior art circuits must thus be designed for safe operation with the worst case highest impedance LED. However, in the present invention, higher impedance LED's automatically tend to dissipate less power than they would under constant current driving, and the interrelationship between LED impedance, current and average voltage appearing at the capacitor tends to make the circuit less sensitive to variations in LED impedance.

It will be appreciated that the frequency, voltage, power, etc. figures discussed above are by way of example only, and not by way of limitation, since through suitable design and selection of components different ranges can be accommodated through the use of the same principles.

The invention can be used in the design of a series of scanners in which the frequency and response time are adjusted either by a potentiometer as shown, or by one or more switching type contacts. It is believed that inventories of the manufacturer, distributor and customer can be reduced by at least 50 percent, resulting in a cost savings. A further saving is realized in the situation wherein a user discovers, after a scanner has been installed, that the response time is too long or the range is too short. The situation can easily be corrected through the use of this invention by adjustment of the device as described above, thus avoiding lost installation time, damaged goods and restocking charges.

It is also possible to use the invention in a scanner having a fixed gain amplifier in the receiver. n such a case the frequency control would effectively be a sensitivity adjustment for the system, where reducing the sensitivity would automatically also reduce the response time.

Numerous variations in design and application of scanners will occur to those skilled in the art, within the scope of this invention.

What is claimed is:

1. A modulated light source for a photoelectric control, comprising:

means for providing a variable frequency, variable duty cycle pulsed modulating signal;

a light emitting diode;

a power source for supplying electrical energy to said light emitting diode;

means operatively connected for selectively causing said light emitting diode to conduct current from said power source in response to said pulsed modulating signal; and means for providing electrical energy to said power source at a controlled rate such that the power supplied to said light emitting diode from said power source on each pulse varies approximately inversely with changes in the duty cycle of the pulsed modulating signal, thereby maintaining the average power of the light emitting diode relatively constant.

2. A modulated light source for a photoelectric control, comprising:

means for providing a variable frequency, variable duty cycle pulsed modulating signal;

light emitting diode;

a power source including a capacitor connected to supply operating potential for said light emitting diode;

means operatively connected for selectively causing said light emitting diode to conduct, current from said capacitor in response to said pulsed modulating signal; and means for providing controlled charging of said capacitor such that the charge of the capacitor varies approximately inversely with changes in the duty cycle of the pulsed modulating signal, thereby maintaining the average power of the light emitting diode relatively constant.

3. A modulated light source according to claim 2 wherein said variable pulsed modulating signal consists of variable frequency, variable duty cycle pulses having a constant pulse duration.

4. A modulated light source according to claim 2 wherein said means for providing controlled charging of said capacitor comprises a further power supply, and an impedance connected for supplying current from said further power supply to said capacitor.

5. A modulated light source according to claim 2 wherein said means for selectively causing said light emitting diode to conduct comprises a switching element in series connection with said light emitting diode and said capacitor without a load impedance for said light emitting diode.

6. A modulated light source according to claim 2 wherein said capacitor discharges only a small percentage of its charge on each pulse.

7. A modulated light source for a photoelectric control, comprising:

means for providing a pulsed modulating signal which can be varied in frequency and also in duty cycle;

a light emitting diode;

a capacitor for supplying operating potential for said light emitting diode;

switching means and means connecting said switching means in series circuit with said light emitting diode and said capacitor, said switching means operative in response to said pulsed modulating signal to cause said light emitting diode to conduct current from said capacitor and thereby emit corresponding pulses of light; and means including an impedance connected for providing recharging current to said capacitor so that the average charge of the capacitor decreases with increases in the duty cycle of the pulsed modulating signal and vice versa to maintain the average power of the light emitting diode relatively constant as the frequency and duty cycle of the modulating signal are changed.

8. A modulated light source for a photoelectric control, comprising:

signal means for providing a variable frequency, variable duty cycle pulsed modulating signal;

a power source for providing operating potential to said signal means;

a light emitting diode;

a capacitor for supplying operating potential to said light emitting diode;

switching means connected in series circuit with said light emitting diode and said capacitor, and responsive to pulses of said modulating signal to cause said light emitting diode to conduct current from said capacitor and to emit corresponding pulses of light; and an impedance connected for providing recharging current from said power source to said capacitor at a controlled rate such that the power supplied by said capacitor to said light emitting diode on each pulse varies approximately inversely with changes in the duty cycle of the pulsed modulating signal, thereby maintaining the average power of the light emitting diode relatively constant.

* * * * *